UNITED STATES PATENT OFFICE.

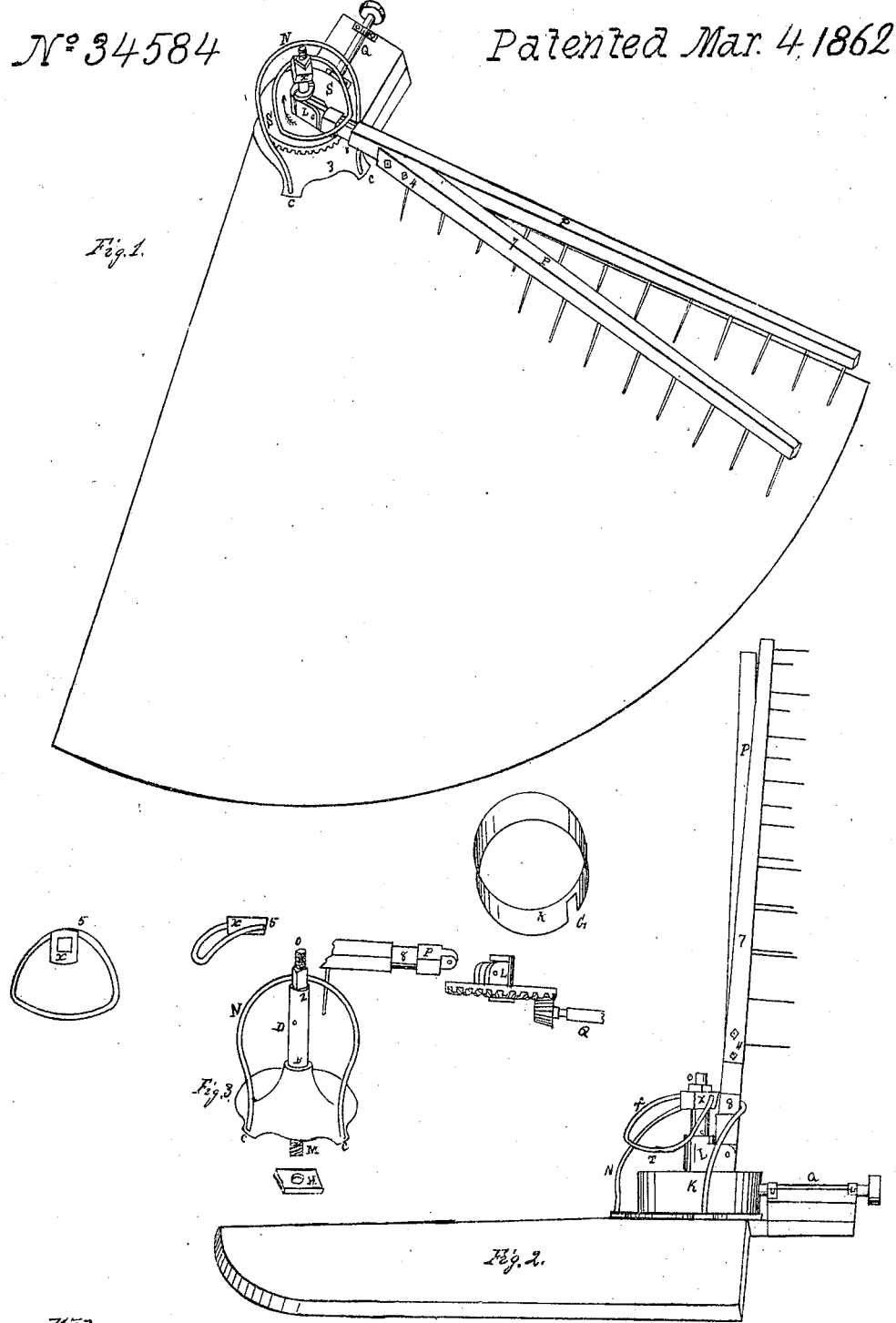

JOHN H. MEARS, OF OSHKOSH, WISCONSIN.

IMPROVEMENT IN RAKES FOR HARVESTERS.

Specification forming part of Letters Patent No. 34,584, dated March 4, 1862.

*To all whom it may concern:*

Be it known that I, JOHN H. MEARS, of Oshkosh, in the county of Winnebago and State of Wisconsin, have invented a new and Improved Raking Attachment for Harvesters; and I do hereby declare that the following is a full, clear, and exact description of the same, reference being had to the annexed drawings, making a part of this specification, in which—

Figure 1 is a perspective view of my invention. Fig. 2 is a vertical section of the same with rake elevated. Fig. 3 is a perspective view of the standard, with the guide N permanently attached to it at C C.

Similar letters of reference indicate corresponding parts in the several figures.

This invention consists in the employment or use of certain shaped guides, arranged in such a manner with a rake that is hinged to the top part of a bevel-wheel, which turns on a vertical standard or spindle. On the top of said standard is attached a guide, curved in such shape as to cause said rake to be forced down from an upright or vertical position to a horizontal one on a platform of a harvester, at any point desired, and keep the rake-teeth pressed down on the platform until by the revolution of the bevel-wheel the rake sweeps the grain from the platform, when it is thrown or brought up to a vertical position by an outside guide and the revolving of the bevel-wheel, in which position it remains while passing the machinery and reel of a harvester.

To enable those skilled in the art to fully understand and construct my invention, I will proceed to describe it.

Fig. 1 represents a platform of a harvester, with the rake P forced down on the platform just back of the cutter-bar, by the construction and position of the guides X and N, acted upon by the bevel-wheel S, on which the rake P is hinged at L. The pinion Q is attached and driven by the machinery of a harvester in any of the known methods. N is a permanent guide attached to the standard 3 at C C. The guide X has a square hole through it, which allows it to rest on the shoulder of Fig. 3 at Z, and retained in its place by a nut at O, Fig. 3. The guides N and X are made of round iron or steel of suitable diameter, except that the guide X has a square block of iron attached to it, similar to 5 5. The bevel-wheel S has a projection permanently attached to its upper side, L, with a slot in which the head of rake P hinges. The spindle of standard, Fig. 3, passes through the bevel-wheel S, which rests on the shoulder B, as shown in Fig. 3, and is kept in its place by a pin passing through the spindle at D, Fig. 3. 8 is a friction-roller, put on the head of rake P to diminish friction as the rake P is passing between the guides X and N, and also while the rake is traversing the platform and passing under guide X at T, Fig. 2. The extra rake 7 can be detached or attached from or to rake P at pleasure, according to the length of the grain to be cut. K is a guard which sets loosely around the bevel-wheel S, the top of wheel S extending just above the top of guard K, so as not to interfere with the rake as it passes under guard X at T, Fig. 2. There is a slot at G to allow guard K to sit over the shaft of pinion Q, Fig. 2. The guard K is for the purpose of keeping the gear clear from straw and dirt. To have the rake P come down on the platform at any point desired, loose the nut H, Fig. 3, on the under side of the platform and turn the standard 3, Fig. 3, either way, as desired, which turns the guides also, as they are attached to the same, and consequently throws the rake on the platform at any point needed, thus allowing the reel of a harvester to be set forward or back without interfering with the rake.

From the above description it will be seen that as the machine is drawn along and the bevel-wheel S turned in the direction of the arrow, Fig. 1, the rake P will sweep across the platform in close contact with it and rake the cut grain from it, after which it rises up to a vertical position, as shown in Fig. 2, which position it keeps while passing the machinery of the harvester and reel, when it is brought down on the platform, as in Fig. 1.

The device as a whole is simple, there being no parts liable to become deranged by use, and can be applied to any of the ordinary harvesters in use. The rake P is firmly pressed down while sweeping the platform by guide X, under which it passes, the friction-roller on rake P coming in contact with the under side of guide X at T, Fig. 2. Guide X is attached to the spindle or standard at a point higher up than the top of guide N, so that when rake P is brought down from a vertical position to a horizontal one on the platform the head of rake P is thrown in under guide X.

Having thus described my invention, what I claim as new, and desire to secure by Letters Patent, is—

Guide X, constructed and operating as set forth, and arranged relatively with guide N, standard 3, bevel-wheel S, and double rake P, as and for the purposes set forth.

JOHN H. MEARS.

Witnesses:
  E. R. COLTON,
  J. JACKSON.